(No Model.)

J. M. BOSTWICK.
MARKER FOR COUNTERS.

No. 437,967.  Patented Oct. 7, 1890.

Witnesses
William Ruger
Noras Hemrij

Inventor.
Joseph M. Bostwick

THE NORRIS PETERS CO., PHOTO-LITHO., WASHINGTON, D. C.

UNITED STATES PATENT OFFICE.

JOSEPH M. BOSTWICK, OF JANESVILLE, WISCONSIN.

MARKER FOR COUNTERS.

SPECIFICATION forming part of Letters Patent No. 437,967, dated October 7, 1890.

Application filed February 2, 1889. Serial No. 298,534. (No model.)

*To all whom it may concern:*

Be it known that I, JOSEPH M. BOSTWICK, a citizen of the United States, residing at Janesville, in the county of Rock and State of Wisconsin, have invented certain new and useful Improvements in Measuring Devices for Store-Counters, of which the following is a specification.

The ordinary method in use for measuring fabrics upon counters is by means of tacks driven into the upper surface of the counter at or near its inner edge to mark the divisions of long measure into yards or parts thereof. The tacks used for this purpose have round convex-shaped heads, and are so driven that their heads are left projecting above the upper surface of the counter. If they work loose, as they frequently do, the edges of the fabric are apt to get caught beneath them as it is handled and pushed about on the counter, and thus become torn. In measuring fabrics with these tacks the clerk or salesman presses with the thumb of one hand an end or point in the fabric upon the head of the tack which marks one end of the measure to be taken, and slides the thumb and fingers of the other hand along the edge of the fabric to the tack-head marking the other end of such measure or a division thereof, and fixes and marks this upon the fabric by placing the side of the thumb or the thumb-nail over the top of the tack as near as he can, locating it by the sense of touch. The use of tacks of this character as a means for measuring fabrics in the manner stated is objectionable in this, to wit: First, it is impracticable to settle with certainty the center of the tack-head that marks the exact termini of the measure to be taken, especially in measuring thick or unyielding fabrics; second, in this, that the location of the tacks is changeable at pleasure, and may be effected without leaving any satisfactory trace or evidence by which it may be determined by mere ocular inspection without testing by measurement whether their position has been changed; third, should the tacks work loose, as they frequently do, the edges of the fabric, as already stated, are apt to get caught beneath them as it is handled and pushed about the counter, and thus become torn.

The object of my invention is to provide a measuring apparatus for counters which will do away with these objections, and said invention will be understood from the ensuing description, taken in connection with the drawings, in which—

Figure 1:
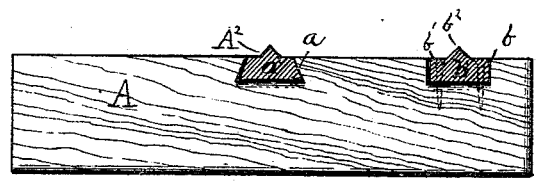
Figure 2:
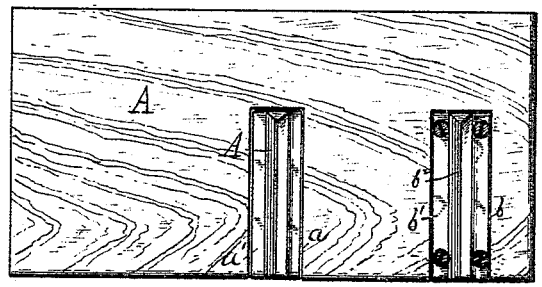

Figure 1 represents an edge elevation of so much of a counter embodying my improvement as is sufficient to an understanding thereof, and Fig. 2 a top plan view of the said counter.

I propose, instead of round-headed tacks referred to in the preamble, to employ knife-edges, or rather, sharp or well-defined edges, marking the termini or division of the measure, and, furthermore, to apply said edges or points to the counter in such manner that they cannot be removed without leaving a permanent mark, so that it may be seen by ocular inspection whether any change of location of any of these markers or points has been made, and thus avoid occasion for periodical retestings under statutes requiring sealers of weights and measures to make tests thereof. To this end I form transverse channels in the top of the counter A, at the inner edge thereof, which may be either of dovetailed form, as at $a$, to receive the dovetail base $a'$ of the knife-edge $A^2$, or may be merely mortises rectangular in cross-section, as at $b$, to receive the rectangular base $b'$ of the knife-edge $b^2$, which can then be secured by tacks or screws, or otherwise. When of dovetailed form a tack or screw may be employed to confine the knife-edges after it has been settled into place; or, if the base is made of sufficient size, it may be driven in and held by wedging against the walls of the channel or mortise; or it may be secured in any other desirable or permanent manner. When thus applied, it is obvious that it cannot be removed without leaving a plainly-visible opening in the counter, and that if this opening is thereafter filled up the outlines will still be visible, and cannot possibly be concealed. These knife-edges will of course project above the upper edge of the counter, and, if flanked by their bases, as shown, the top of the counter will be made to come flush with the upper surface of the latter.

With the arrangement above described it is evident that goods can be accurately measured, and that there will be no danger of giving short measure.

So far as the use of mortises, channels, or grooves is intended to prevent or check attempts at surreptitious displacement of markers or divisions of the measure it is immaterial to the generic features of my invention whether the bases entering into such mortises, channels, or grooves are provided with knife-edges or markers of other outline.

I am aware that knife-edges have been employed in devices for gaging the elongation and compression of materials under strain for the purpose of clamping such materials to opposite members of the gage or vernier, so that the elongation or compression of such material will impart motion through the knife-edges to such sliding members, and this I do not claim; but What I do claim, and desire to secure by Letters Patent, is—

1. The combination, substantially as hereinbefore set forth, of a counter having transverse grooves, mortises, or channels in one of its upper edges marking termini or divisions of a long measure, and a series of markers having bases fitted into such grooves, mortises, or channels.

2. The combination, substantially as hereinbefore set forth, of a counter having transverse mortises, grooves, or channels in one of its upper edges, and a series of knife-edges having bases fitted into such mortises, grooves, or channels, said knife-edges marking the points of termini and divisions of long measure.

JOSEPH M. BOSTWICK.

Witnesses:
WILLIAM RUGER,
NORA J. EMERY.